(12) United States Patent
Hosoe et al.

(10) Patent No.: US 7,842,275 B2
(45) Date of Patent: Nov. 30, 2010

(54) HYDROGEN ABSORBING MATERIAL, METHOD FOR PRODUCING THE SAME, AND HYDROGEN STORAGE CONTAINER

(75) Inventors: Mitsuya Hosoe, Saitama (JP); Yusuke Sogawa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 327 days.

(21) Appl. No.: 12/002,041

(22) Filed: Dec. 14, 2007

(65) Prior Publication Data

US 2008/0146442 A1   Jun. 19, 2008

(30) Foreign Application Priority Data

Dec. 15, 2006   (JP) .............. 2006-339031

(51) Int. Cl.
*C01B 6/00* (2006.01)
*C01B 3/26* (2006.01)

(52) U.S. Cl. ...................... 423/645; 423/650

(58) Field of Classification Search .......... 423/645
See application file for complete search history.

(56) References Cited

U.S. PATENT DOCUMENTS 7,118,611 B2 * 10/2006 Snow et al. ............... 75/255

2005/0164878 A1   7/2005 Morioka et al.
2005/0191232 A1 * 9/2005 Vajo et al. ................ 423/648.1

FOREIGN PATENT DOCUMENTS

| JP | 2004-18980 | 1/2004 |
|---|---|---|
| JP | 2004-293571 | 10/2004 |

* cited by examiner

*Primary Examiner*—Melvin C Mayes
*Assistant Examiner*—Kenneth Vaden
(74) *Attorney, Agent, or Firm*—Lahive & Cockfield, LLP; Anthony A. Laurentano (57) ABSTRACT

After $AlH_3$ is synthesized, ball milling is performed under a condition in which a force of 2 G to 20 G (G represents the acceleration of gravity) is applied, to thereby provide $AlH_3$ having an X-ray diffraction pattern in the form of a halo pattern. That is, for example, nanostructured $AlH_3$ is provided, in which a grain boundary phase intervenes in a matrix phase, a side length t2 of the matrix phase is not more than 20 nm, and a width w2 of the grain boundary phase is not more than 10 nm. Alternatively, amorphous $AlH_3$ may be provided. Further, hydrogen is released from $AlH_3$ on which ball milling has been completed, and then the hydrogen is absorbed to induce a change into $AlH_x$ (provided that $0<x \leq 3$ is satisfied). A dopant may also be added. A hydrogen storage container is constructed accommodating the hydrogen absorbing material, which is obtained as described above, inside the container.

3 Claims, 11 Drawing Sheets

HYDROGEN ABSORBING MATERIAL, METHOD FOR PRODUCING THE SAME, AND HYDROGEN STORAGE CONTAINER

BACKGROUND OF THE INVENTION

1. Field of the Invention

The present invention relates to a hydrogen absorbing material, which is capable of reversibly storing or releasing a hydrogen gas, a method for producing the same, and a hydrogen storage container which accommodates the hydrogen absorbing material therein.

2. Description of the Related Art

As is well known, a fuel cell generates electric power by supplying a fuel gas such as hydrogen to an anode, while supplying an oxygen-containing gas such as oxygen to a cathode. Therefore, for example, a fuel cell vehicle, which carries the fuel cell thereon, includes a gas storage container, which is filled with hydrogen. The fuel cell vehicle runs by using reaction gases made up of atmospheric air, which serves as the oxygen-containing gas, together with hydrogen, which is supplied from the gas storage container.

As clearly appreciated from this fact, the larger the hydrogen-accommodating amount of the gas storage container is, the longer the distance that the fuel cell vehicle can successfully run over is. However, if an excessively large gas storage container is carried by the vehicle, the weight of the fuel cell vehicle is increased. Consequently, an inconvenience arises in that the load on the fuel cell also is increased.

From this viewpoint, various trials have been made in order to improve the hydrogen-accommodating amount, while maintaining a small volume for the gas storage container. For example, it has been suggested in Japanese Laid-Open Patent Publication No. 2004-293571 to employ a tank (container) in which the pressure resistance thereof is improved, and which is filled with hydrogen gas at a relatively high pressure of 35 to 75 MPa.

Another technique for improving the hydrogen accommodating amount may be conceived of, in which a hydrogen absorbing or storing material, such as a hydrogen absorbing or storing alloy, is used, due to the following reasons. That is, as is well known, the hydrogen absorbing material is capable of occluding hydrogen depending on a temperature change, and also when the hydrogen absorbing material is accommodated within a container, the hydrogen accommodating amount is increased by an amount at which the hydrogen absorbing material is capable of occluding or storing hydrogen therein. For example, as described in Japanese Laid-Open Patent Publication No. 2004-18980, a hydrogen absorbing material containing $AlH_3$ exhibits a large hydrogen occludable amount, and hence the hydrogen absorbing material is effective to improve the amount at which hydrogen is accommodated.

$AlH_3$ releases hydrogen in accordance with the following formula (1), while $AlH_3$ absorbs hydrogen in accordance with the following formula (2). Formulas (1) and (2) represent reactions that are caused at arbitrary absorbing/releasing sites, and do not imply that all of the $AlH_3$ is oxidized/reduced.

$$AlH_3 \rightarrow Al + \tfrac{3}{2}H_2 \quad (1)$$

$$Al + \tfrac{3}{2}H_2 \rightarrow AlH_3 \quad (2)$$

$AlH_3$, which is described in Japanese Laid-Open Patent Publication No. 2004-18980, is a crystalline material, in which sharp peaks appear, as may be clearly understood from the X-ray diffraction pattern shown in FIG. 2 of Japanese Laid-Open Patent Publication No. 2004-18980. In the case of crystalline $AlH_3$, the hydrogen releasing reaction of formula (1) advances relatively easily, however, the hydrogen absorbing reaction of formula (2) does not advance easily at ordinary temperatures because the activation energy is large. If the hydrogen absorbing reaction of formula (2) is advanced at ordinary temperatures, by allowing $H_2$ gas to make contact with absorbing/releasing sites that have been converted into Al, a high pressure of not less than several hundreds of MPa is required.

However, as described in paragraph [0004] of Japanese Laid-Open Patent Publication No. 2004-293571, the filling pressure of an ordinary tank is about 20 MPa. Moreover, the filling pressure is 75 MPa at a maximum in the case of the tank disclosed in Japanese Laid-Open Patent Publication No. 2004-293571. In the case of such a filling pressure, it is difficult to advance the hydrogen absorbing reaction of formula (2) at or in the vicinity of room temperature, which represents a temperature generally used by the fuel cell.

SUMMARY OF THE INVENTION

A general object of the present invention is to provide a hydrogen absorbing material, which makes it possible to advance a hydrogen absorbing reaction at low temperatures and pressures, even though the hydrogen absorbing material contains AlHx.

A principal object of the present invention is to provide a hydrogen absorbing material in which the hydrogen accommodating amount thereof is improved remarkably.

Another object of the present invention is to provide a method for producing a hydrogen absorbing material as described above.

Still another object of the present invention is to provide a hydrogen storage container, which accommodates therein a hydrogen absorbing material as described above.

According to one aspect of the present invention, a hydrogen absorbing material is provided containing AlHx (provided that $0 < x \leq 3$ is satisfied) as an aluminum hydride, and wherein an X-ray diffraction pattern of AlHx is a halo pattern.

A matrix phase, which is approximated to a square shape and which has a side length of approximately several hundreds of μm, and a grain boundary phase which intervenes between the matrix phase squares and which has a width of several μm, are present in the microstructure of crystalline AlHx. When an X-ray diffraction measurement is performed on crystalline AlHx, a diffraction pattern is obtained, in which sharp peaks originating from an α-phase, a β-phase, and a γ-phase appear. However, crystalline $AlH_3$, which is constructed as described above, does not occlude hydrogen significantly unless a pressure is applied thereto at a predetermined extent.

On the contrary, a hydrogen absorbing material, containing AlHx having an X-ray diffraction pattern that exhibits a halo pattern, is capable of absorbing or storing a large amount of hydrogen, even when the pressure applied thereto is small.

A first preferred example of aluminum hydride, in which the X-ray diffraction pattern is a halo pattern, is a so-called nanostructured AlHx, wherein the grain boundary phase thereof is allowed to intervene within the matrix phase. Further, a side length of the matrix phase is not more than 20 nm, and a width of the grain boundary phase is not more than 10 nm.

Absorption and release of hydrogen are easily performed within the grain boundary phase, as compared with the matrix phase. Compared to crystalline AlHx, in the case of nanostructured AlHx, the occupation ratio of the grain boundary phase within the microstructure is larger. That is, the grain boundary phase, in which hydrogen is easily absorbed and released, exists abundantly within nanostructured AlHx. Therefore, it is possible to occlude a large amount of hydrogen even at low pressures.

The fact that the X-ray diffraction pattern of such a nanostructure is a halo pattern is also supported by the Scherrer equation.

A second preferred example of aluminum hydride, in which the X-ray diffraction pattern thereof is a halo pattern, is amorphous aluminum hydride. In this case, hydrogen is occluded or stored by absorbing/releasing sites having a low activation energy. Accordingly, it is possible to occlude a large amount of hydrogen even at low pressures.

According to another aspect of the present invention, a method is provided for producing a hydrogen absorbing material containing AlHx (provided that 0<x≦3 is satisfied), having an X-ray diffraction pattern that is a halo pattern, the method comprising:

a step of performing ball milling on the $AlH_3$, under a condition in which a force of 2 G to 20 G (wherein G represents acceleration of gravity) is applied in a hydrogen atmosphere, thereby producing $AlH_3$ having an X-ray diffraction pattern that is a halo pattern;

a step of releasing hydrogen from the $AlH_3$ on which ball milling has been performed; and a step of absorbing hydrogen into the $AlH_3$, from which hydrogen has been released previously, to thereby provide AlHx (provided that 0<x≦3 is satisfied).

In the present invention, a large force of 2 G to 20 G acts on the $AlH_3$ when ball milling is performed. Such a force allows the $AlH_3$ to exhibit an X-ray diffraction pattern as a halo pattern.

That is, according to the present invention, the hydrogen absorbing material, which is capable of occluding or absorbing a large amount of hydrogen even at low pressures, can be obtained simply by adding the step of applying a force to the $AlH_3$, by performing ball milling.

According to still another aspect of the present invention, there is provided a hydrogen storage container, which accommodates a hydrogen absorbing material therein capable of absorbing and releasing hydrogen, wherein the hydrogen absorbing material contains AlHx (provided that 0<x≦3 is satisfied) having an X-ray diffraction pattern that is a halo pattern.

The hydrogen storage container comprises AlHx of which the X-ray diffraction pattern is a halo pattern. Therefore, a large amount of hydrogen can be stored even at low pressures. Therefore, it is unnecessary to provide a heating apparatus in addition to the hydrogen storage container, in order to facilitate the occlusion of hydrogen. Further, it is unnecessary to excessively increase the hydrogen filling pressure. Therefore, a simple arrangement for the container can be maintained, and it is possible to avoid expensive investments in plants and equipment as well.

As described above, when the hydrogen absorbing material is used, which contains $AlH_3$ that exhibits an X-ray diffraction pattern as a halo pattern, it is possible to construct the hydrogen storage container easily, wherein the hydrogen storage container can store a large amount of hydrogen even at low pressures.

As described above, a preferred example of AlHx is exemplified by a nanostructured AlHx, wherein a grain boundary phase is allowed to intervene within a matrix phase thereof, a side length of the matrix phase is not more than 20 nm, and a width of the grain boundary phase is not more than 10 nm. Of course, it is also allowable to use amorphous AlHx.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

An explanation will be given in detail below with reference to the accompanying drawings, which exemplify a preferred embodiment of the hydrogen absorbing material according to the present invention, along with a method for producing the same, in relation to a hydrogen storage container which accommodates the hydrogen absorbing material therein.

Figure 1:
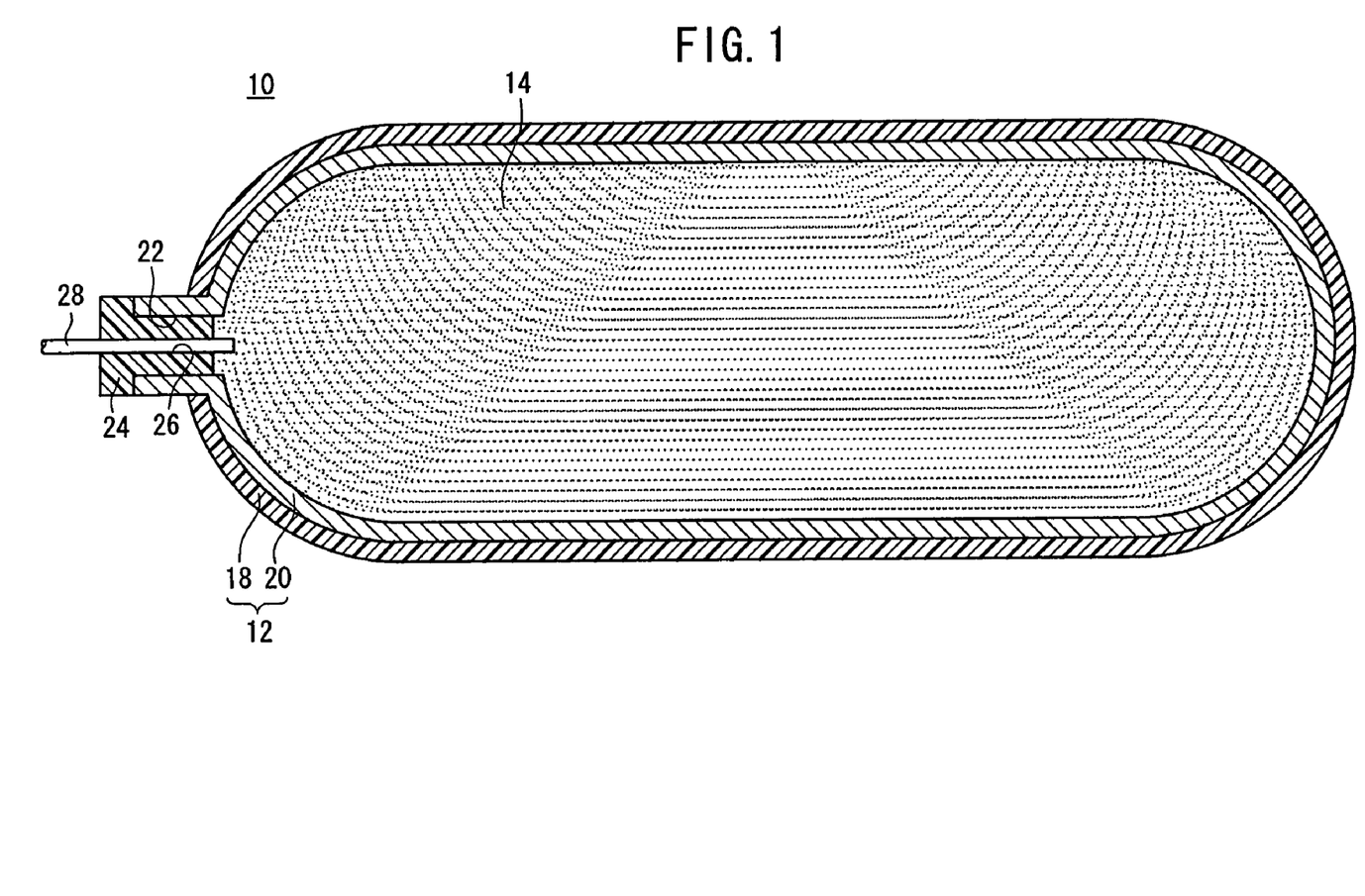
FIG. 1 is a schematic sectional view illustrating an entire hydrogen storage container in the longitudinal direction, according to an embodiment of the present invention.

FIG. 1 is a schematic sectional view illustrating an entire hydrogen storage container 10 in the longitudinal direction, according to the embodiment of the present invention. The hydrogen storage container 10 is constructed by accommodating a powdery hydrogen absorbing material 14 within a container 12.

The container 12 has an outer shell 18 and a liner 20, which is stuck to the inner wall of the outer shell 18. In particular, the outer shell 18 is composed of, for example, a fiber-reinforced resin. On the other hand, a material for the liner 20 may be a resin material, such as polyethylene. However, the material for the liner 20 may also be a metal, such as aluminum and/or an aluminum alloy. When a metal having a high thermal conductivity is used as the material for the liner 20, heat is quickly transferred to the outer shell 18. Therefore, an advantage is obtained in that heat, which is generated during filling of the container 12 with hydrogen gas, is easily removed.

An opening 22 is formed at one end of the container 12, wherein the opening 22 is closed by a closing member 24.

One end of a gas supply tube 28 is inserted into a through-hole 26, which is disposed substantially at a central portion of the closing member 24. On the other hand, the other end of the gas supply tube 28 is connected to an unillustrated gas supply source.

A material that contains an aluminum hydride, specifically AlHx (provided that $0<x\leq3$ is satisfied, which applies to this section as well as the following sections of the present specification, unless otherwise noted) is selected as the hydrogen absorbing material 14, which is capable of reversibly absorbing and releasing hydrogen gas. That is, the hydrogen absorbing material 14 may be a simple substance made up of AlHx. Alternatively, the hydrogen absorbing material 14 may be obtained by adding various dopants, represented by Pd, to AlHx. In the event that a dopant is added to the material, the dopant is carried, for example, by AlHx.

Figure 2:
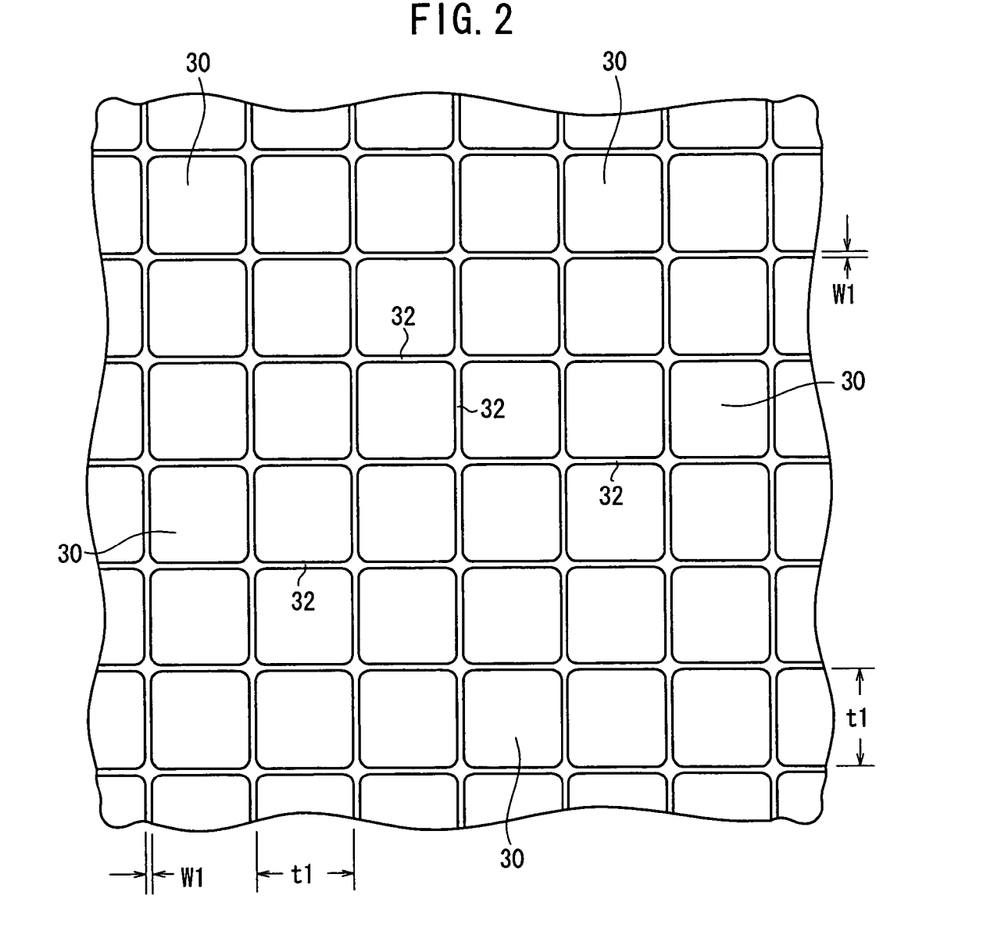
FIG. 2 is a schematic view of a microstructure, which schematically depicts the microstructure of crystalline $AlH_3$.
Figure 3:
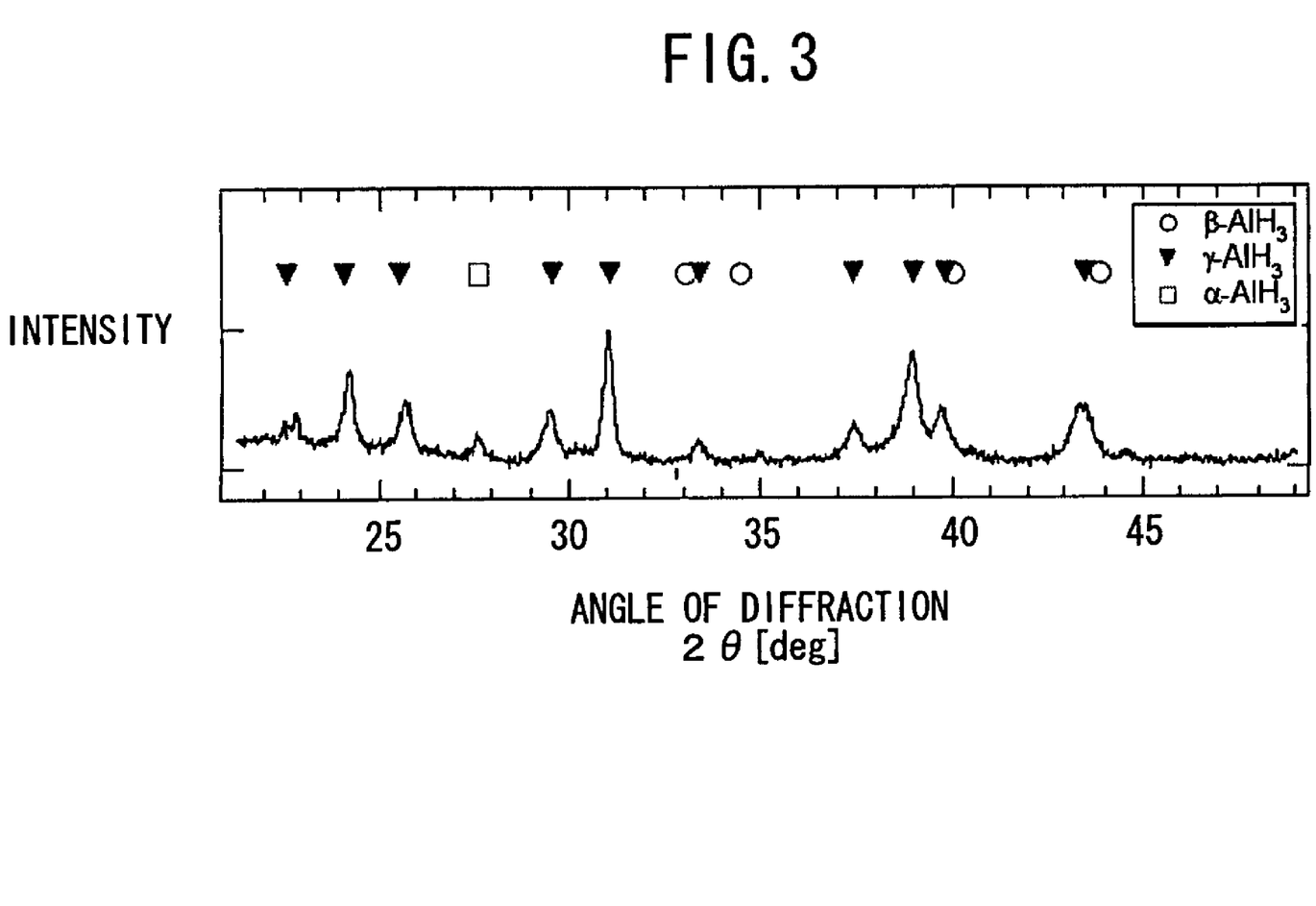
FIG. 3 is an X-ray diffraction pattern of crystalline $AlH_3$.

A microstructure of crystalline $AlH_3$ is schematically shown in FIG. 2, and an X-ray diffraction pattern thereof is shown in FIG. 3. As shown in FIG. 2, crystalline $AlH_3$ has a matrix phase 30, which is approximated substantially by squares, and a grain boundary phase 32 which intervenes between the matrix phase squares 30, 30. In the case of crystalline $AlH_3$, a side length t1 of the matrix phase 30 is approximately 100 μm, and the width w1 of the grain boundary phase 32 is several μm. A ratio, which is occupied by the grain boundary phase 32 within the microstructure, is several % by volume. When an X-ray diffraction pattern of crystalline $AlH_3$ is measured, a diffraction pattern is obtained in which sharp peaks originating from an α-phase, a β-phase, and a γ-phase appear (see FIG. 3).

Figure 4:
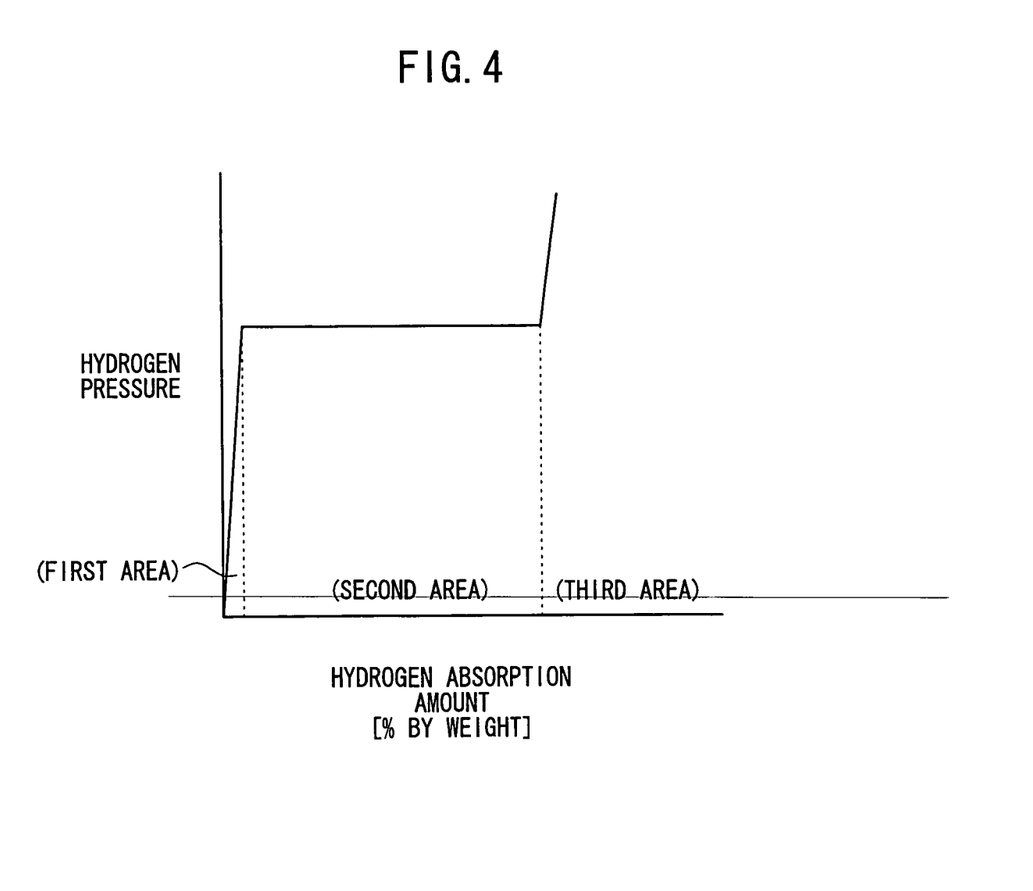
FIG. 4 is a schematic PCT diagram obtained when crystalline aluminum hydride absorbs hydrogen.

FIG. 4 schematically shows a pressure-composition isothermal diagram (PCT diagram), obtained when crystalline aluminum hydride absorbs hydrogen. As shown in FIG. 4, appearing in the PCT diagram of crystalline aluminum hydride are a first area in which the hydrogen absorption amount increases in proportion to an increase in the pressure of hydrogen, a second area in which the hydrogen absorption amount increases at a constant hydrogen pressure, and the third area in which the hydrogen absorption amount again increases in proportion to an increase in hydrogen pressure.

According to diligent investigations performed by the present inventors, the grain boundary phase 32 contributes to hydrogen absorption or occlusion within crystalline AlHx ($0<x<3$), especially within the first area thereof, whereas the hydrogen absorption amount increases as the hydrogen pressure is raised. As clearly understood from FIG. 4, a hydrogen pressure dependency is observed in relation to the hydrogen absorption amount within the first area. That is, absorbing/releasing sites are present in the grain boundary phase 32, in which the activation energy required for hydrogen occlusion is relatively low. Therefore, hydrogen can be absorbed or occluded even at relatively low pressures.

However, as described above, the grain boundary phase 32 exists within the microstructure at an amount of only several % by volume. Therefore, the hydrogen absorption amount of the grain boundary phase 32 becomes saturated earlier. Of course, in such a situation, the hydrogen absorption amount is extremely small.

In the second area, the matrix phase 30, which occupies a greater portion within the microstructure, absorbs hydrogen. In the case of a crystalline material, the respective crystal lattices have approximately the same structure. Therefore, the activation energy required for the respective crystal lattices to occlude hydrogen also is substantially equivalent.

In the matrix phase 30, an extremely large activation energy is required to absorb hydrogen. Therefore, when the temperature is constant, hydrogen is not absorbed when the hydrogen pressure is low. Consequently, hydrogen begins to be actively absorbed at a point in time when the hydrogen pressure arrives at several thousands of atm. (several hundreds of MPa), wherein the hydrogen absorption amount increases at a constant pressure. That is, a plateau region appears within the second area.

In the third area, in which hydrogen pressure is further increased, the hydrogen absorption amount increases in accordance with an increase in pressure. In other words, the matrix phase 30 absorbs hydrogen until arriving at a saturation amount corresponding to the increase in hydrogen pressure.

Figure 5:
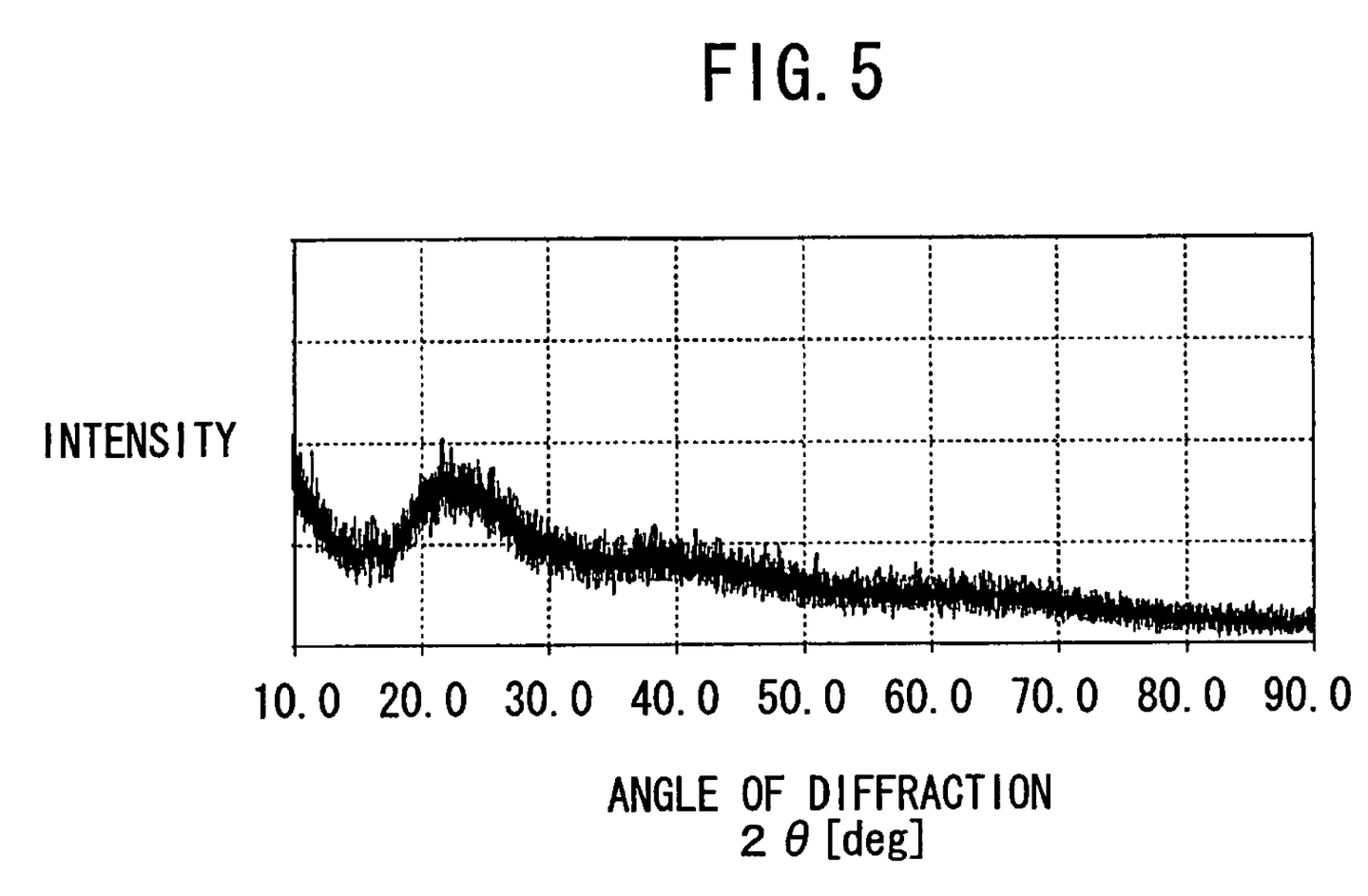
FIG. 5 is an X-ray diffraction pattern of AlHx contained within a hydrogen absorbing material, according to the embodiment of the present invention.

On the contrary, as shown in FIG. 5, the X-ray diffraction pattern of AlHx occurring in the hydrogen absorbing material 14 according to the embodiment of the present invention exhibits a halo pattern, in which only a broad peak appears on the low angle side.

Figure 6:
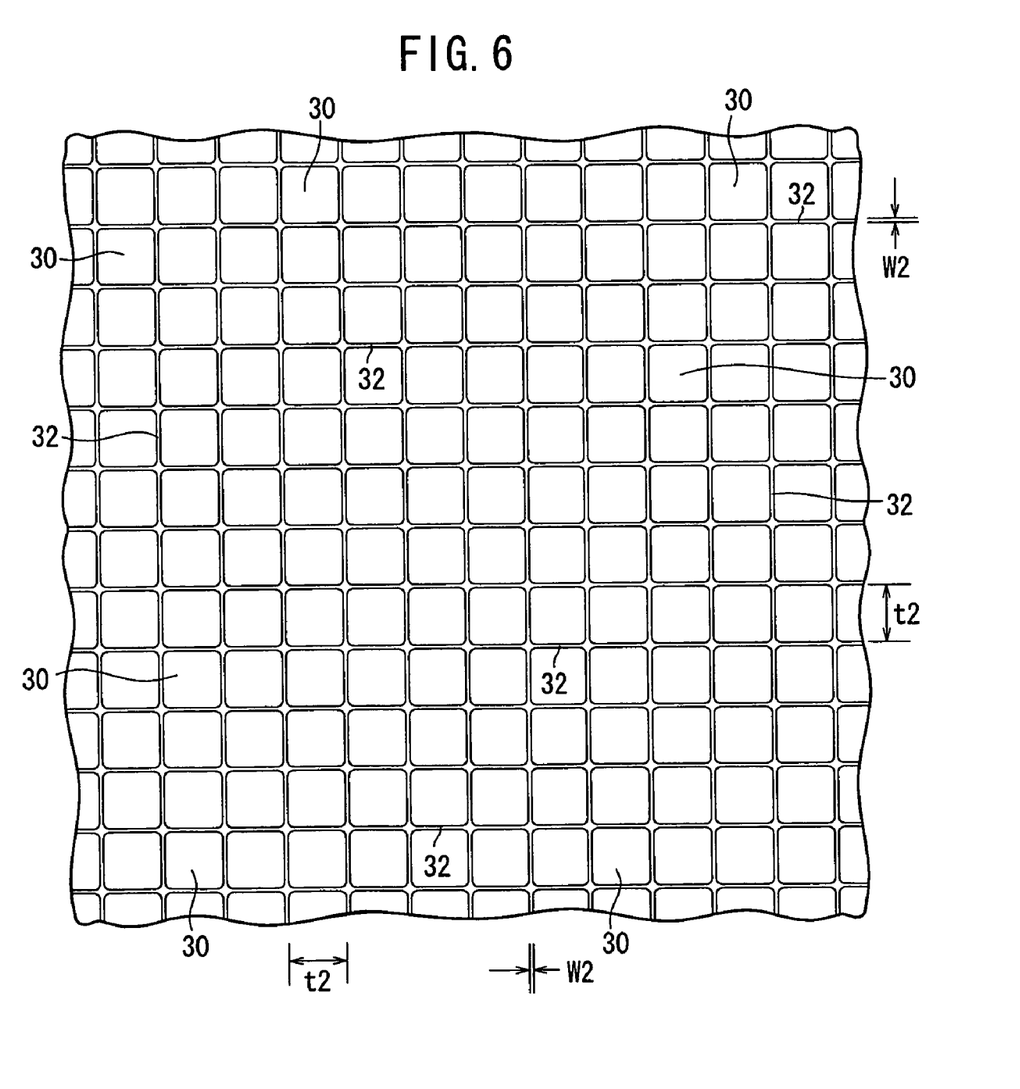
FIG. 6 is a schematic view of a microstructure, which schematically depicts the microstructure of a first example of AlHx (nanostructured AlHx), in which the X-ray diffraction pattern shown in FIG. 5 is obtained.

A first example of AlHx, in which the X-ray diffraction pattern thereof is a halo pattern as described above, comprises a material in which the microstructure thereof is a nanostructure, as shown in FIG. 6.

In the case of nanostructured AlHx, the side length t2 of the matrix phase 30 is approximately several nm to ten and several nm, and is 20 nm at a maximum. On the other hand, the width w2 of the grain boundary phase 32 is 1 to several nm for the most part, and is 10 nm at a maximum. As may be clearly understood from FIG. 6, the ratio occupied by the grain boundary phase 32 is larger than that of crystalline AlHx, and ranges to as much as 20 to 50% by volume.

As described above, compared with crystalline AlHx, in the case of nanostructured AlHx, the ratio of the grain boundary phase 32 is extremely large. As described above, the grain boundary phase 32 absorbs hydrogen easily, even when the hydrogen pressure is relatively small. Therefore, in the case of nanostructured AlHx, which contains a large grain boundary phase 32, the hydrogen absorption amount increases under a relatively low pressure condition of several tens of MPa, as shown in the PCT diagram in FIG. 7. In other words, as compared with crystalline AlHx, nanostructured AlHx can absorb a large amount of hydrogen even when the hydrogen pressure is relatively small, e.g., ten and several to several tens of MPa, due to the presence of the large grain boundary phase 32, which absorbs hydrogen relatively easily because of the small activation energy required to absorb hydrogen.

Figure 7:
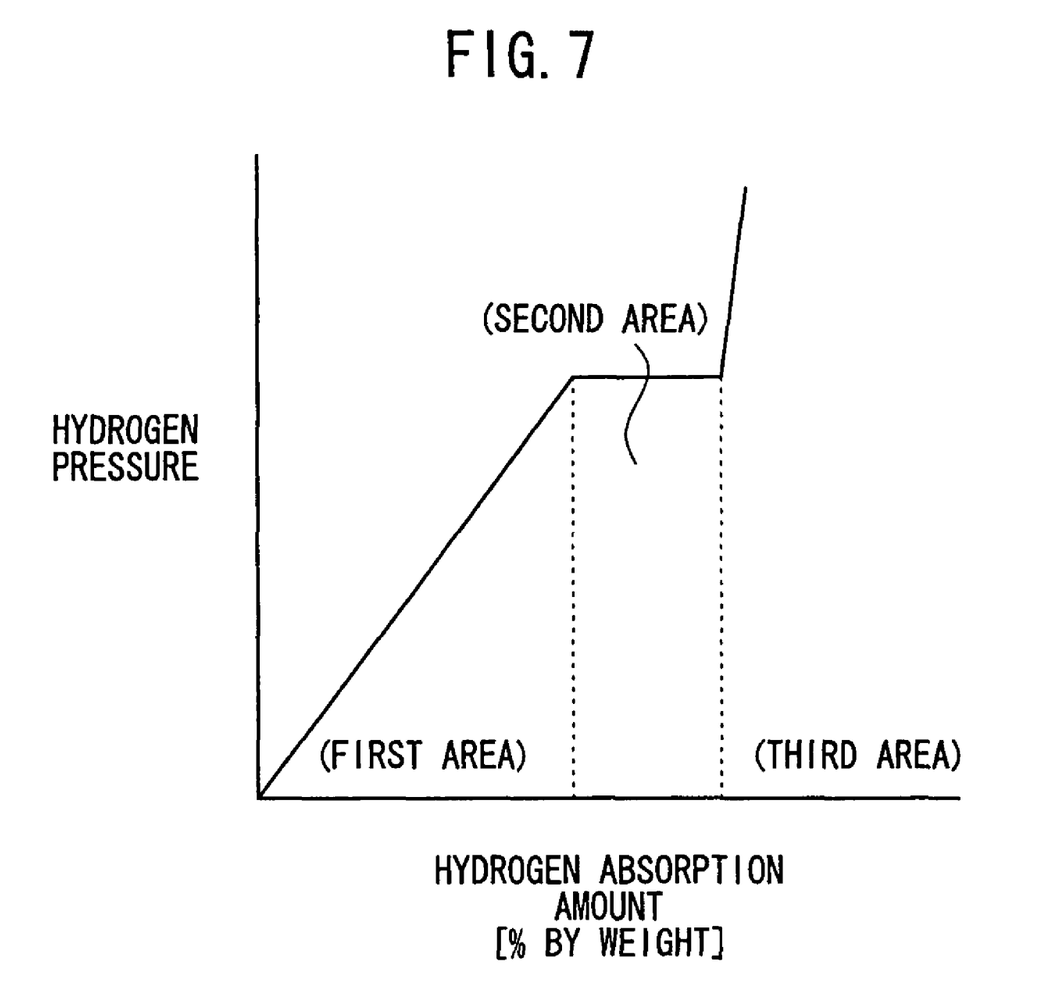
FIG. 7 is a schematic PCT diagram obtained when nanostructured AlHx having the microstructure shown in FIG. 6 absorbs hydrogen.

In the case of nanostructured AlHx, the plateau region is short as compared with crystalline AlHx, because the ratio of the matrix phase 30 is relatively small.

A second example of AlHx, in which the X-ray diffraction pattern thereof exhibits a halo pattern, is amorphous (non-crystalline material) AlHx.

Figure 8:
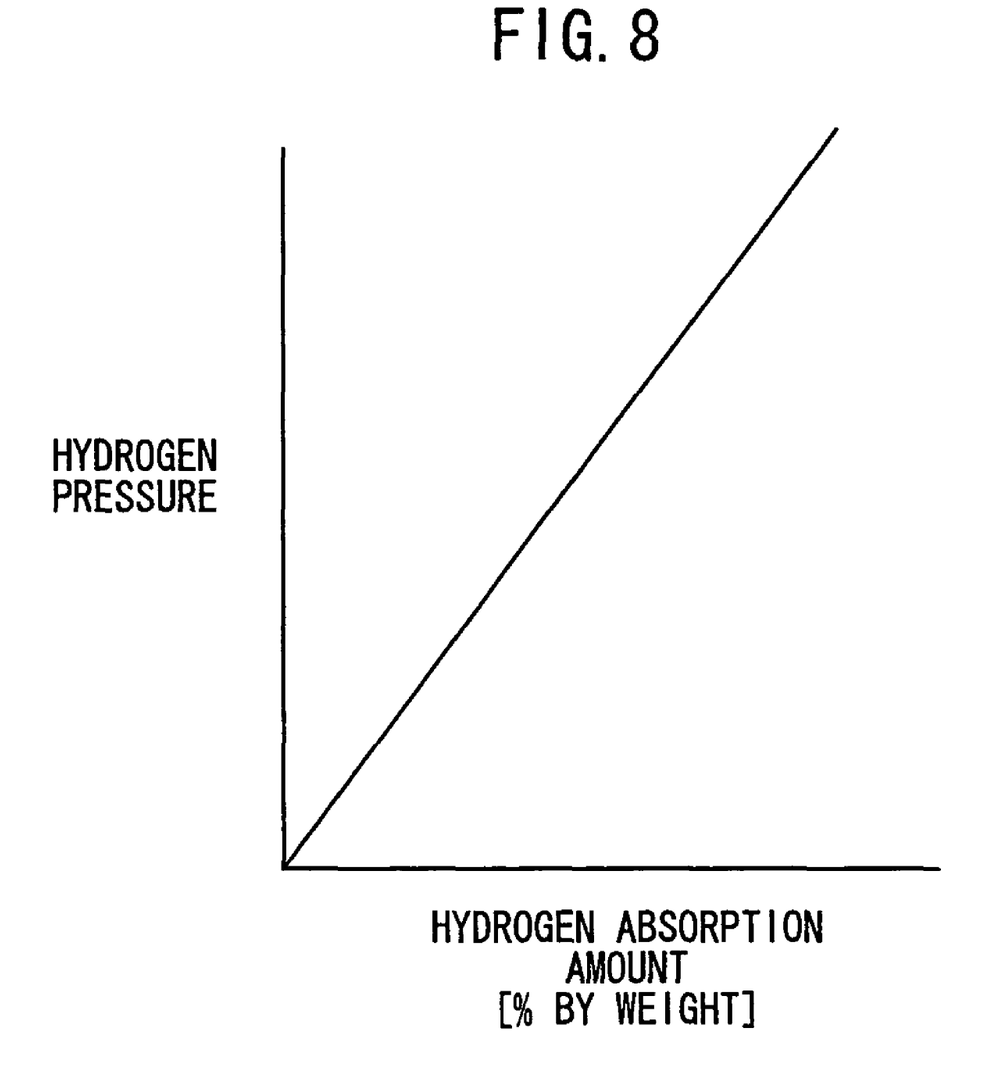
FIG. 8 is a schematic PCT diagram obtained when amorphous AlHx absorbs hydrogen.

In the case of amorphous AlHx, Al atoms are positioned randomly. Therefore, various activation energy levels are required in order to allow the absorbing/releasing sites to occlude hydrogen. That is, absorbing/releasing sites having a high activation energy and absorbing/releasing sites having a low activation energy are present in a mixed manner. Therefore, when amorphous AlHx absorbs hydrogen, the hydrogen absorption amount increases in proportion to an increase in hydrogen pressure, as shown in FIG. 8, and a plateau region is not observed. Therefore, hydrogen can be absorbed at relatively low pressures, of ten and several to several tens of MPa, at ordinary temperatures or in the vicinity thereof.

As described above, when a hydrogen absorbing material 14 containing AlHx having an X-ray diffraction pattern in the form of a halo pattern is used, it is possible to reversibly absorb hydrogen at relatively low pressures, of ten and several to several tens of MPa, at or in the vicinity of ordinary temperature. Therefore, the hydrogen storage container 10, which accommodates such a hydrogen absorbing material 14 therein, can store a large amount of hydrogen, as compared with a container accommodating a different type of hydrogen absorbing material (for example, a hydrogen absorbing alloy) in accordance with the conventional technique, even when the hydrogen pressure is relatively small, i.e., ten and several to several tens of MPa.

Therefore, it is unnecessary to provide an additional heating apparatus in order to facilitate absorption of hydrogen. It is also unnecessary to excessively increase the pressure at which the container 12 is filled. Consequently, according to the embodiment of the present invention, a simple arrangement can be maintained, while costly investments in plant and equipment can be avoided.

A hydrogen absorbing material 14 containing AlHx, which exhibits a halo pattern, can be obtained as follows.

At first, $AlH_3$ is synthesized.

$AlH_3$ can be obtained, for example, by dissolving $AlCl_3$ in a diethyl ether solution of $LiAlH_4$, while performing a reaction at ordinary temperature. Specifically, LiCl, which is produced by the reaction, is separated by filtration, and diethyl ether is evaporated by reducing the pressure of the filtrate at room temperature using a vacuum pump, for example. When the pressure is reduced at 40 to 80° C. to effect drying, solid $AlH_3$ is obtained. In such a situation, the $AlH_3$ is crystalline.

Ball milling is performed on the $AlH_3$, under a condition in which a force of 2 G to 20 G (provided that G represents the acceleration of gravity) is applied in a hydrogen gas atmosphere. Specifically, $AlH_3$ is enclosed in a pot in a hydrogen gas atmosphere, together with milling balls. The pot is interposed by a press-fastening shaft and a rotary base provided rotatably on a disk-shaped pedestal plate of a planetary type ball milling apparatus. Further, both the disk-shaped pedestal plate and the rotary base are rotated.

In the planetary type ball milling apparatus, the pot undergoes revolving motion in accordance with rotation of the disk-shaped pedestal plate, while the pot also undergoes rotating motion in accordance with rotation of the rotary base. That is, the pot revolves about the center of the rotary shaft, which is connected to the disk-shaped pedestal plate, and additionally, the pot rotates about the center of the press-fastening shaft. Force acts on the $AlH_3$ accommodated in the pot, in accordance with such revolving and rotating motions.

A force of 2 G to 20 G can be applied by adjusting the treatment time along with the number of revolutions of the disk-shaped pedestal plate and the rotary base. For example, when the diameter of the pot is 80 mm and the diameter of the disk-shaped pedestal plate is about 300 mm, then the number of revolutions of the disk-shaped pedestal plate (revolving motion) is 50 to 500 rpm, whereas the number of revolutions of the rotary base (rotating motion) is 50 to 1,000 rpm. Both revolving and rotating motions are continued appropriately for 1 to 15 hours.

$AlH_3$, to which a force of 2 G to 20 G is applied by subjecting the $AlH_3$ to ball milling as described above, is converted into a nanostructured (see FIG. 6) or amorphous form. More specifically, a structure is provided that exhibits a halo pattern in the X-ray diffraction measurement thereof. During ball milling, the interior of the pot is maintained in a hydrogen atmosphere. Therefore, an oxidizing reaction, in which $AlH_3$ is decomposed into Al and $H_2$, is suppressed. Stated otherwise, it is possible thereby to reliably obtain either nanostructured or amorphous $AlH_3$.

Subsequently, the $AlH_3$, which has been subjected to ball milling, is accommodated inside a pressure resistant container, whereupon gas is evacuated from the pressure resistant container. Accordingly, the interior of the pressure resistant container is placed in a pressure-reduced state, whereby hydrogen is released from the $AlH_3$. In other words, the $AlH_3$ undergoes dehydrogenation. As a result, absorbing/releasing sites, which are capable of reversibly absorbing and releasing hydrogen, are provided in the $AlH_3$. Further, by eliminating hydrogen from the $AlH_3$, a flow path, through which hydrogen is movable, is formed within the $AlH_3$.

Subsequently, hydrogen is introduced into the pressure resistant container at a low pressure. Such introduced hydrogen passes through the flow path, which was formed in the $AlH_3$ in accordance with dehydrogenation as described above, whereupon hydrogen is absorbed by the absorbing/releasing sites of the $AlH_3$. Stated otherwise, the $AlH_3$ is rehydrogenated. As a result, AlHx is produced.

As described above, $AlH_3$, which is a source of AlHx, is either nanostructured or amorphous. Therefore, the obtained AlHx is also nanostructured or amorphous. When an X-ray diffraction measurement is performed on $AlH_3$, a halo pattern is obtained. That is, a hydrogen absorbing material 14 is obtained, which contains a large grain boundary phase 32, and which enables a large hydrogen absorption amount even at low pressures.

A dopant may be added to the $AlH_3$. In this case, for example, mechanical grinding is appropriately carried out using a planetary type ball milling apparatus, after $AlH_3$ and the dopant are enclosed in the pot.

EXAMPLE 1

13 g of $AlCl_3$ was added to and dissolved in 300 milliliters of a diethyl ether solution of 1 mol/liter $LiAlH_4$, followed by being reacted until production of gas was not observed at ordinary temperature. After that, LiCl, which was precipitated in the solution, was separated by means of filtration. The filtrate was subjected to pressure reduction for 1 hour using a vacuum pump in order to evaporate diethyl ether therefrom, followed by being subjected to pressure reduction and drying at respective temperatures of 40° C., 60° C., and 80° C., in order to obtain 2 g of $AlH_3$ particles. The operation described above was repeated so as to synthesize 6 g of $AlH_3$ particles in total.

Subsequently, 3 g of $AlH_3$ was enclosed in a pot having an internal volume of 80 milliliters together with milling balls, wherein the enclosure was performed in a hydrogen atmosphere, and the hydrogen pressure was 1 MPa in the pot.

After that, the pot was interposed by a press-fastening shaft and a rotary base on a disk-shaped pedestal of a planetary type ball milling apparatus (produced by Fritsch, German), to apply ball milling. The diameter of the disk-shaped pedestal was 300 mm, and the number of revolutions was set to 350 rpm. The number of revolutions of the rotary base, or in other words, the number of revolutions of the rotating motion of the pot, was set to 800 rpm. The ball milling time was 10 hours. Under such a condition, 10 G of force was applied to the $AlH_3$.

After completion of ball milling, the lid was disengaged from the pot in an argon atmosphere, and the $AlH_3$ was taken out of the pot. The obtained $AlH_3$ was placed in a container, whereupon the container was subjected to vacuum drawing for 3 hours at 60° C. Accordingly, the $AlH_3$ was subjected to dehydrogenation.

Subsequently, hydrogen was introduced into the container at a filling pressure of 10 MPa. In accordance with the introduction of hydrogen, the $AlH_3$, which had been subjected to dehydrogenation, reabsorbed hydrogen. As a result, AlHx was produced.

An X-ray diffraction measurement was performed on the obtained AlHx using an X-ray diffraction measuring apparatus produced by Bruker. As a result, a halo pattern was obtained, which was approximately the same as the X-ray diffraction pattern shown in FIG. 5. Specifically, only a broad peak appeared in the vicinity of the diffraction angle of 22°. On the other hand, an X-ray diffraction measurement was also performed on AlH$_3$, which had not yet been subjected to the ball milling. As a result, sharp peaks originating from the α-phase, the β-phase, and the γ-phase appeared, as shown in FIG. 3.

Figure 9:
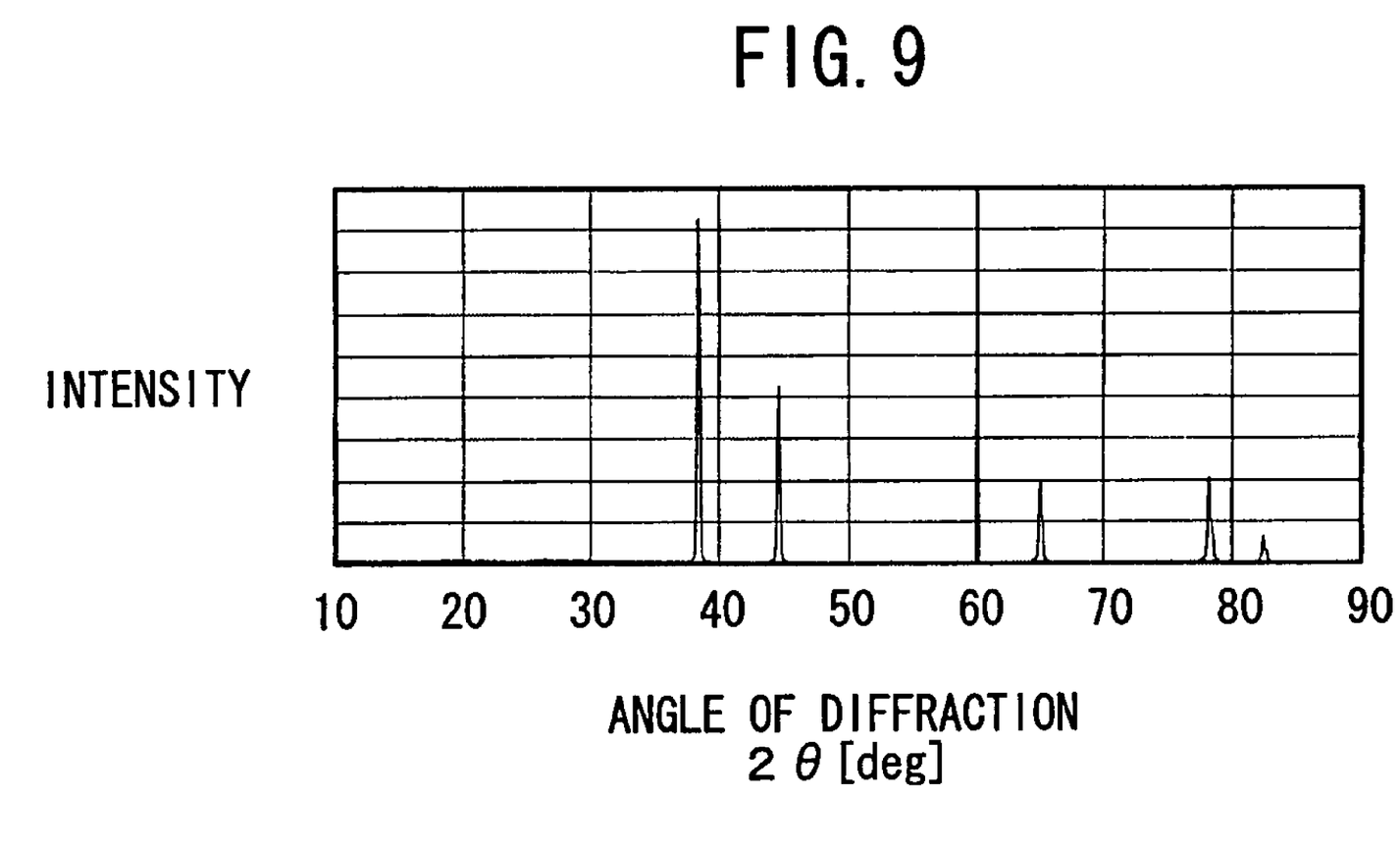
FIG. 9 is an X-ray diffraction pattern obtained after making contact with hydrogen and after dehydrogenation of $AlH_3$.

A part of 6 g of AlH$_3$ particles obtained as described above was sampled, whereupon the AlH$_3$ was dehydrogenated, followed by making contact with hydrogen in order to form AlHx, in the same manner as described above except that ball milling was not performed thereon. An X-ray diffraction measurement was performed on the obtained AlHx. Accordingly, as shown in FIG. 9, a diffraction pattern was obtained in which sharp peaks appeared, thus indicating that the obtained AlHx was crystalline.

According to the results described above, it is readily apparent that AlHx, which exhibits a halo pattern, is obtained by performing ball milling.

EXAMPLE 2

0.3 g of AlH$_3$ was sampled from AlH$_3$, after being subjected to ball milling, and was enclosed in the sample cell of an apparatus used for measuring a hydrogen pressure-composition isothermal diagram of the volume type. At first, the interior of the sample cell was evacuated for 3 hours at 60° C. in order to release hydrogen from AlH$_3$.

Thereafter, the temperature of the measurement system was kept at 25° C., while hydrogen gas was introduced stepwise into the sample cell, until arriving at 10 MPa and thereby raising the pressure. That is, a process, in which a predetermined constant pressure was maintained, and wherein the pressure was raised after elapse of a predetermined time period and the pressure was maintained to be constant again, was repeated so that the final pressure was 10 MPa. Accordingly, hydrogen was absorbed by the absorbing/releasing sites, having been provided as Al, and thus AlHx was obtained. On the other hand, the hydrogen absorption amount was calculated from the hydrogen absorption equilibrium pressure, at each constant pressure.

Subsequently, the process was repeated, in which the pressure inside the sample cell was maintained at a predetermined value, and the pressure was lowered after elapse of a predetermined time period and the pressure was maintained to be constant again, such that the pressure was reduced until the pressure reached 0.008 MPa. The hydrogen release amount was calculated from the hydrogen release equilibrium pressure, during periods in which a constant pressure was maintained.

Figure 10:
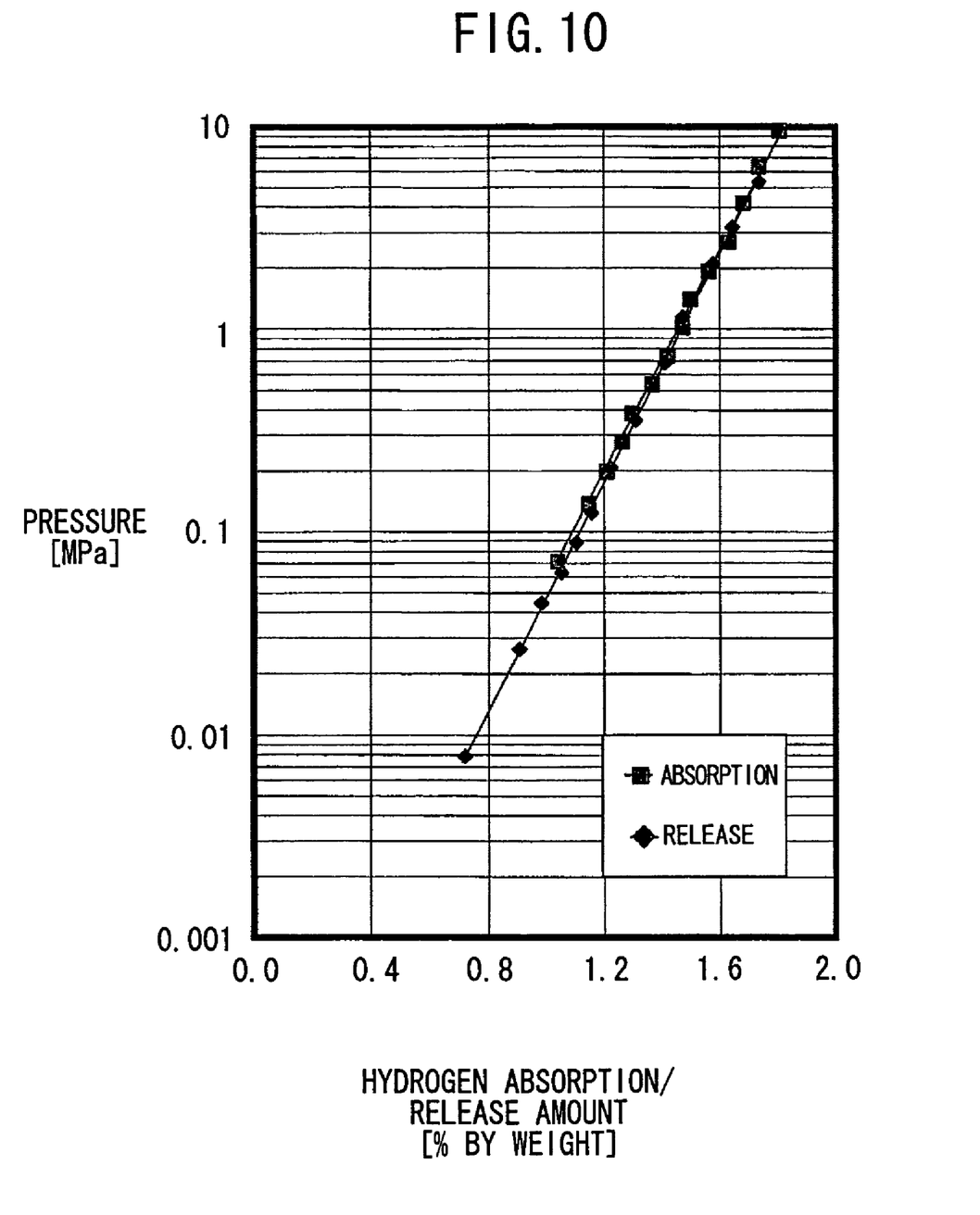
FIG. 10 is a graph illustrating a relationship between hydrogen pressure and a hydrogen absorption amount and a hydrogen release amount, in relation to AlHx obtained by performing ball milling.

The relationship between the aforementioned hydrogen pressure in the sample cell, the hydrogen absorption amount, and the hydrogen release amount is shown as a graph in FIG. 10. The horizontal axis indicates, by percentage, the weight of hydrogen that is absorbed and released with respect to the total amount (0.3 g) of AlHx. According to FIG. 10, it is appreciated that in the case of AlHx, which exhibits a halo pattern in the X-ray diffraction pattern thereof, hydrogen is absorbed/released in an amount depending on the hydrogen pressure, even when the hydrogen pressure is small.

Figure 11:
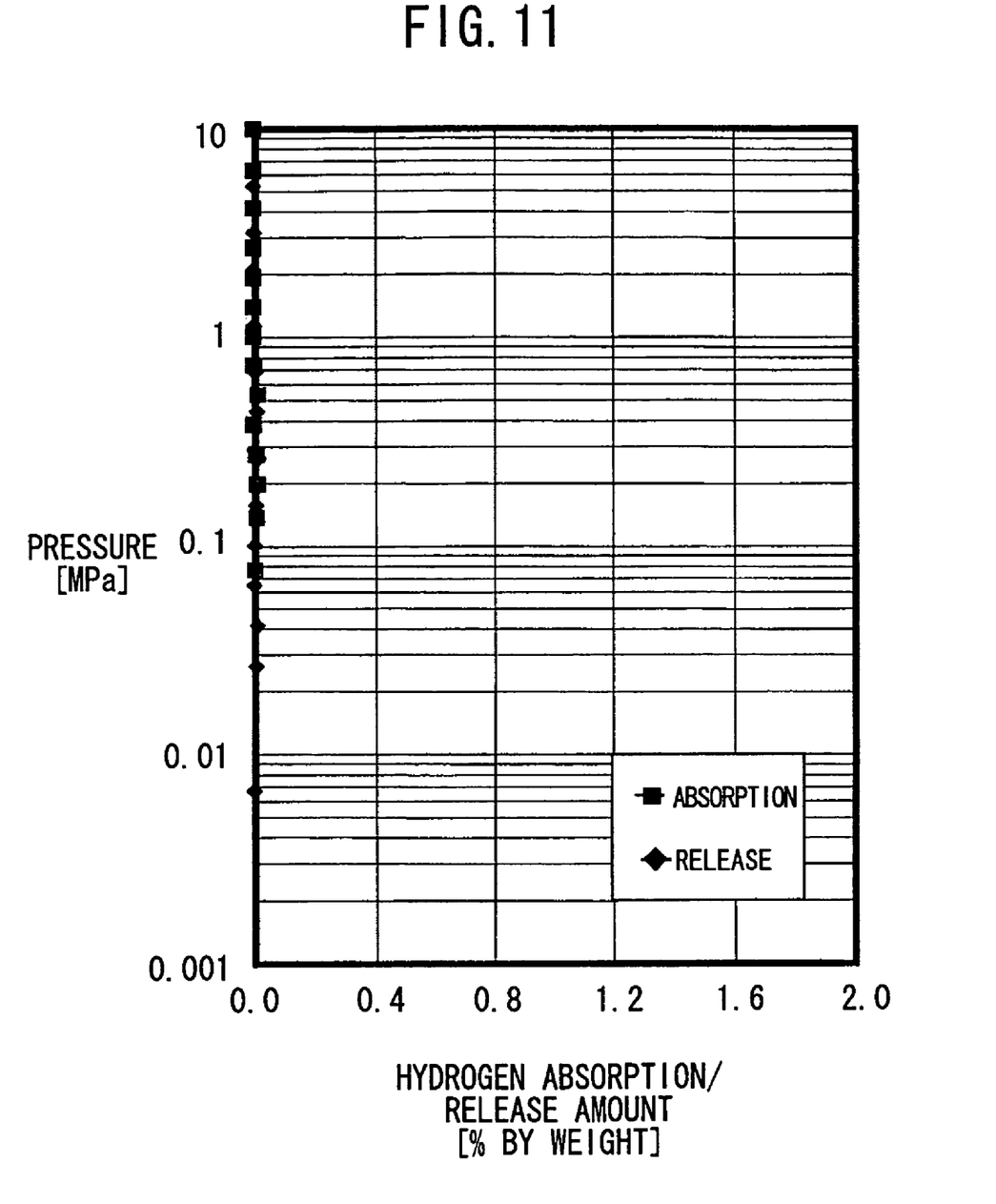
FIG. 11 is a graph illustrating a relationship between hydrogen pressure and a hydrogen absorption amount and a hydrogen release amount, in relation to AlHx that was not subjected to ball milling.

For purposes of comparison, 0.3 g of AlH$_3$ particles were sampled from 6 g of AlH$_3$ particles, obtained as described above, and were enclosed, as is, in a sample cell of an apparatus for measuring a hydrogen pressure-composition isothermal diagram of the volume type. The hydrogen absorption and release amount were calculated thereafter, in the same manner as described above, wherein the obtained result was as shown in FIG. 11. According to FIG. 11, it should clearly be understood that a weight change does not occur at all, in the case that the AlHx was not subjected to ball milling. In other words, hydrogen cannot be absorbed at all when the hydrogen pressure is low.

According to the results described above, it is readily apparent that AlHx, which exhibits a halo pattern in the X-ray diffraction pattern, is a hydrogen absorbing material, which is capable of absorbing hydrogen even at low pressures. It is speculated that the reason thereof is due to the fact that, within the microstructure, the ratio occupied by the grain boundary phase is large.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A hydrogen absorbing material containing AlH$_x$ provided that 0<x<=3 is satisfied as an aluminum hydride,
   wherein an X-ray diffraction pattern of said AlH$_x$ is a halo pattern,
   wherein a grain boundary phase thereof is allowed to intervene within a matrix phase of said AlH$_x$, a side length of said matrix phase is not more than 20 nm, and a width of said grain boundary phase is not more than 10 nm, wherein the grain boundary phase ranges from 20% to 50% by volume of the AlH$_x$.

2. The hydrogen absorbing material according to claim 1, wherein a dopant is added to said AlHx.

3. The hydrogen absorbing material according to claim 2, wherein said dopant is Pd.

* * * * *